United States Patent [19]

Domoto et al.

[11] Patent Number: 4,580,149

[45] Date of Patent: Apr. 1, 1986

[54] CAVITATIONAL LIQUID IMPACT PRINTER

[75] Inventors: Gerald A. Domoto; Aron Sereny, both of Briarcliff Manor, N.Y.

[73] Assignee: Xerox Corporation, Stamford, Conn.

[21] Appl. No.: 702,768

[22] Filed: Feb. 19, 1985

[51] Int. Cl.[4] .......... G01D 15/18

[52] U.S. Cl. .......... 346/140 R

[58] Field of Search .......... 346/140 R, 75

[56] References Cited

U.S. PATENT DOCUMENTS

| | | | |
|---|---|---|---|
| 4,251,824 | 2/1981 | Hara et al. | 346/140 R |
| 4,275,290 | 6/1981 | Cielo et al. | 219/216 |
| 4,376,945 | 3/1983 | Hara et al. | 346/140 R |
| 4,409,596 | 10/1983 | Ishii | 346/1.1 |
| 4,410,899 | 10/1983 | Haruta et al. | 346/140 R |
| 4,463,359 | 7/1984 | Ayata et al. | 346/1.1 |
| 4,532,530 | 7/1985 | Hawkins | 346/140 R |

FOREIGN PATENT DOCUMENTS 52-118177 9/1977 Japan .

OTHER PUBLICATIONS

IBM Tech Discl. Bulletin, vol. 18, No. 4, Sep. 1975, by D. E. Fisher and J. L. Mitchell, entitled "Ultrasonic Cavity Resonance for Ink-on-Demand Pats. Ink Formation".

*Primary Examiner*—Joseph W. Hartary
*Attorney, Agent, or Firm*—Robert A. Chittum

[57] ABSTRACT

An ink jet printhead for use in a thermal ink jet printer having bubble-generating heating elements formed symmetrically around the entrances to passageways in the ink-holding printhead chamber that terminate as nozzles. The heating elements are individually addressable with current pulses to form vapor bubbles, which, during collapse, produce an impact force that expels and propels droplets toward a recording medium. An alternate embodiment includes an ultrasonic generator in the printhead chamber to produce pressure waves in the ink contained in the chamber. The current pulse applied to the heating element is synchronized with the lower pressure wave to obtain bubble growth with substantially lower temperatures resulting in a more energy efficient printhead.

7 Claims, 6 Drawing Figures

CAVITATIONAL LIQUID IMPACT PRINTER

BACKGROUND OF THE INVENTION

1. Field of the Invention

This invention relates to drop-on-demand ink jet printing and more particularly to thermal ink jet printing wherein the ink droplet expulsion mechanics involve fluid inertia of the ink in the vicinity of a collapsing vapor bubble in a pool of ink.

2. Description of the Prior Art

Generally speaking, drop-on-demand ink jet printing systems can be divided into two types. The type using a piezoelectric transducer to produce a pressure pulse that expels a droplet from a nozzle or the type using thermal energy to produce a vapor bubble in an ink-filled channel that expels a droplet. This latter type is referred to as thermal ink jet printing or bubble ink jet printing and is the subject matter of the present invention. In existing thermal ink jet printing, the printhead comprises one or more ink filled channels, such as disclosed in U.S. Pat. No. 4,463,359 to Ayata et al, communicating with a relatively small ink supply chamber at one end and having an opening at the opposite end, referred to as a nozzle. A thermal energy generator, usually a resistor, is located in the channels near the nozzle a predetermined distance therefrom. The resistors are individually addressed with a current pulse to momentarily vaporize the ink and form a bubble which expels an ink droplet. As the bubble grows, the ink bulges from the nozzle and is contained by the surface tension of the ink as a meniscus. As the bubble begins to collapse, the ink still in the channel between the nozzle and bubble starts to move towards the collapsing bubble, causing a volumetric contraction of the ink at the nozzle and resulting in the separation of the bulging ink as a droplet. The acceleration of the ink out of the nozzle while the bubble is growing provides the momentum and velocity of the droplet in a substantially straight line direction towards a recording medium, such as paper.

In U.S. Pat. No. 4,463,359, a thermal ink jet printer is disclosed having one or more ink-filled channels which are replenished by capillary action. A meniscus is formed at each nozzle to prevent ink from weeping therefrom. A resistor or heater is located in each channel at a predetermined distance from the nozzles. Current pulses representative of data signals are applied to the resistors to momentarily vaporize the ink in contact therewith and form a bubble for each current pulse. Ink droplets are expelled from each nozzle by the growth of the bubbles which causes a quantity of ink to bulge from the nozzle and break off into a droplet at the beginning of the bubble collapse. The current pulses are shaped to prevent the meniscus from breaking up and receding too far into the channels, after each droplet is expelled. Various embodiments of linear arrays of thermal ink jet devices are shown such as those having staggered linear arrays attached to the top and bottom of a heat sinking substrate and those having different colored inks for multicolored printing. In one embodiment, a resistor is located in the center of a relatively short channel having nozles at both end thereof. Another passageway is connected to the open-ended channel and is perpendicular thereto to form a T-shaped structure. Ink is replenished to the open-ended channel from the passgeway by capillary action. Thus, when a bubble is formed in the openended channel, two different recording mediums may be printed simultaneously.

U.S. Pat. No. 4,275,290 to Cielo et al discloses a thermally activated liquid ink printing head having a plurality of orifices in a horizontal wall of an ink reservoir. In operation, an electric current pulse heats selected resistors that surround each orifice and vaporizes the nonconductive ink. The vapor condenses on a recording medium, such as paper, spaced above and parallel to the reservoir wall, causing a dark or colored spot representative of a picture element or pixel. Alternatively, the ink may be forced above the orifice by partial vaporization of the ink, so that the ink is transported by a pressure force provided by vapor bubbles. Instead of partially or completely vaporizing the ink, it can be caused to flow out of the orifices by reduction of the surface tension of the ink. By heating the ink in the orifices, the surface tension coefficient decreases and the meniscus curvature increases, eventually reaching the paper surface and printing a spot. A vibrator can be mounted in the reservoir to apply a fluctuating pressure to the ink. The current pulse to the resistors are coincident with the maximum pressure produced by the vibration.

U.S. Pat. No. 4,251,824 to Hara et al discloses a thermally activated liquid ink jet recording method which involves driving one or a group of heaters to produce vapor bubbles in ink-filled channels of a printhead which expel ink droplets. In FIGS. 7A and 7B, a single resistor is used for each channel to expel drops from nozzles thereof. A plurality of resistors in each channel are shown in FIG. 12 which are sequentially driven to expel droplets. In FIG. 2C, simultaneous driving of varying quantities of resistors in each channel expels droplets of varying diameters.

Japanese Patent Application No. 52-118177 filed Sept. 30, 1977 and published without examination on Apr. 24, 1979 as Laid-Open (Kokai) No. 54-51837 discloses an air bubble produced by a heating element that increases the pressure in the ink chamber which causes ink droplets to be forced out of the chamber through an orifice. The bubble is then cooled by endothermic action and the bubble collapses.

U.S. Pat. No. 4,376,945 to Hara et al discloses a printhead for a thermal ink jet printer wherein various adhesives are used to attach and to hold the printhead parts together. The printhead has one or more ink-filled channels with each have a discharging orifice for ejecting ink droplets at one end, the other end of the channels connect to an ink supply chamber, and a heating element for applying heat energy to the ink in each channel near the orifice. A means for generating mechanical pressure change in the ink flowing into the chamber is provided. The applictaion of the heat energy and the mechanical pressure change is synchronized for the ejection of a droplet. In one embodiment a preliminary biasing heater is used.

U.S. Pat. No. 4,410,899 to Haruta et al discloses a method of forming ink droplets by a heat generator which forms bubbles to expel the droplets, but the bubbles do not fill the channels so that the ink is not totally separated from the nozzle even when the bubbles reach their maximum size.

U.S. Pat. No. 4,409,596 to Ishii discloses a piezoelectric driven ink jet printer in which an intermediate pulses are continuously applied to the ink and a droplet is expelled therefrom whenever a second ejection pulse is combined the intermediate pulse.

IBM Technical Disclosure Bulletin, Vo. 18 No. 4, September 1975 to Fisher et al discloses an ink-on-demand ink jet printer in which jet formation is triggered ultrasonically and the ink reservoir is an ultrasonic cavity which enhances the ultrasonic effects on the meniscus at the orifice. A high-voltage electrode having an orifice therein and an acceleration electrode sandwich the printing medium. A voltage on the order of 2–4 kilovolts is applied to the electrode with the orifice and a voltage of about 7 kilovolts is applied to the acceleration electrode. The voltage from the electrode with the orifice causes a meniscus to be formed at the ink reservoir orifice. When it is desired to expel a droplet, resonant frequency is applied to piezoelectric crystal forming part of the ink reservoir. The combined electrostatic and hydrostatic forces on the ink, when not at resonance, are not sufficient to cause leakage of the ink or formation of a droplet which travels through the electrode orifice and impinges on the printing medium.

SUMMARY OF THE INVENTION

It is the object of the invention to use the impact induced by collapsing bubbles to produce moving droplets of liquid ink on demand.

It is another object of this invention to form bubbles around each nozzle at relatively low pressure to reduce power requirements.

It is still another ojbect of this invention to produce high speed droplets from more efficient, lower power-consuming, bubble-forming heaters that substantially surround the printhead nozzles.

In accordance with the present invention, a thermal ink jet printhead is mounted on a carriage adapted for reciprocating motion across the surface of a recording medium, such as paper. The paper is stepped a predetermined distance each time the printhead's direction is reversed to print another line. The printhead comprises a housing having an internal chamber for containing a quantity of liquid ink under a predetermined pressure. The housing chamber has one wall parallel to and spaced from the recording medium. A linear series of passageways parallel to the stepping direction of movement by the recording medium extend perpendicularly through the chamber wall, so that the passageway entrance communicates with the chamber interior and the passageway exit serves as nozzles and confront th recording medium. A heating element or resistor is formed on the chamber wall at each passageway entrance and substantially surround it. The housing chamber is filled with liquid ink at a predetermined pressure and the ink is replenished as it is used from an ink supply via flexible hose. Each heating element is individually addressable by selectively applied current pulses from a controller in response to receipt by the controller of digitized data signals.

The current pulses cause the heating elements to transfer thermal energy to the ink which vaporizes the ink and produces temporary bubbles that collapse almost immediately at the termination of the current pulses. The passageways are sufficiently small in cross-sectional area and long enough, so that the flow resistance and fluid inertia of the ink in the passageway prevents weeping of ink from the nozzles during bubble formation and growth. When the bubbles collapse toward the heating element, droplets are expelled from the passageway nozzles because of the impact induced by the rapidly collapsing bubbles.

An alternate embodiment of the printhead uses an ultrasonic generator to produce sinusoidal pressure waves in the ink in the housing chamber. The lower value portion of the pressure waves coincide with the application of the current pulses to the heating elements while the upper value portions occur shortly after the peak bubble size is reached and as the bubble collapse is in full progress.

This invention is in contrast with the existing prior art which teaches linear arrays of ink-filled channels each having a heating element which, when electrically pulsed, produces a high pressure bubble which accelerates the quantity of ink in the channel between the heating element and the nozzle and forces a droplet out of the nozzle. The initiation of the bubble collapse causes the quantity of ink still between the nozzle and heating element to move in a direction opposite of the accelerated quantity, breaking it off as a droplet. The meniscus then tends to recede ink into the channel from the nozzle before the ink in the channel is replenished by capillary action.

DESCRIPTION OF THE PREFERRED EMBODIMENT

Figure 1:
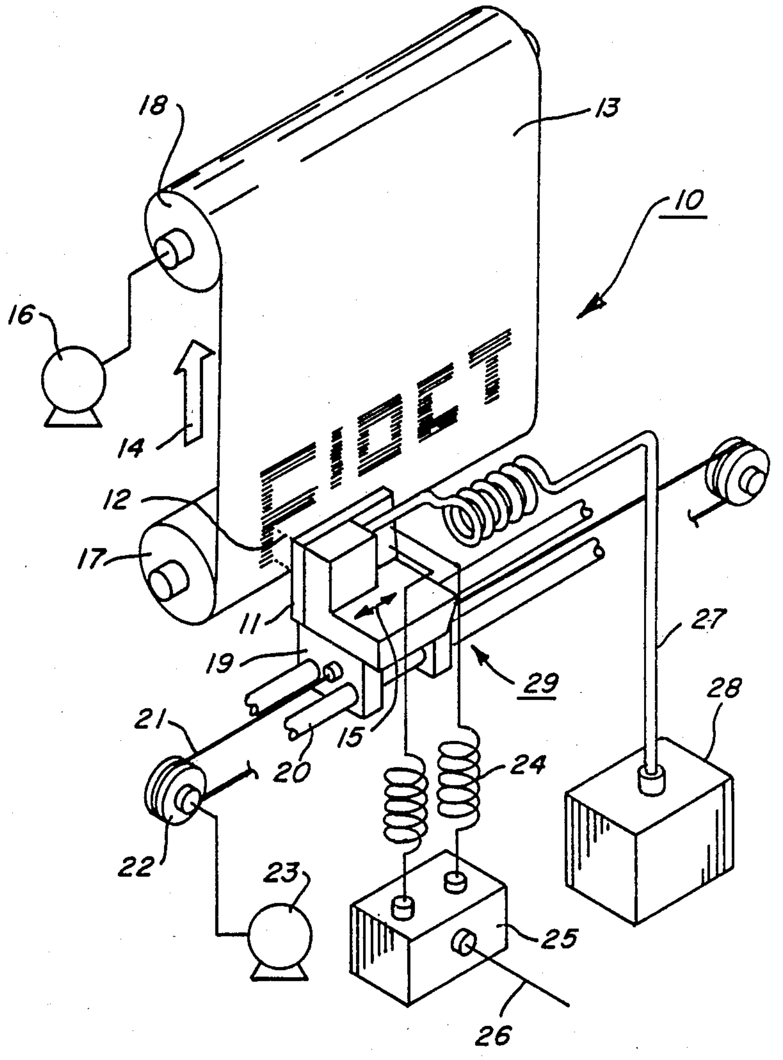
FIG. 1 is a schematic perspective view of a carriage type thermal ink jet printing system incorporating the printhead of the present invention.

A typical carriage type thermal ink jet printing device 10 is schematically shown in FIG. 1. Printhead 11 with an ink filled chamber is mounted on reciprocating carriage assembly 29. Droplets 12 are propelled to the recording medium 13 which is stepped by stepper motor 16 a preselected distance in the direction of arrow 14 each time the printhead traverses in one direction across the recording medium in the direction of arrow 15. The recording medium, such as paper, is stored on supply roll 17 and stepped onto roll 18 by stepper motor 16 by means well known in the art.

The printhead 11 is fixedly mounted on support base 19 which is adapted for reciprocal movement by any well known means such as by two parallel guide rails 20. The printhead and base comprise the reciporcating carriage assembly 29 which is moved back and forth across the recording medium in a direction parallel thereto and perpendicular to the direction in which the recording medium is stepped. The reciprocal movement of the printhead is achieved by a cable 21 and a pair of rotatable pulleys 22, one of which is powered by a reversible motor 23.

Current pulses are applied to the individual bubble-generating heating elements 44 (shown in FIG. 2) formed around a linear array of passageways 30 (FIG. 2) within the printhead 11 by conduits 24 from controller 25. The current pulses which produce the ink droplets are generated in response to digitial data signals received by the controller through electrode 26, more fully explained later. The ink is maintained full and at a predetermined pressure during operation via flexible hose 27 from ink supply 28.

Figure 2:
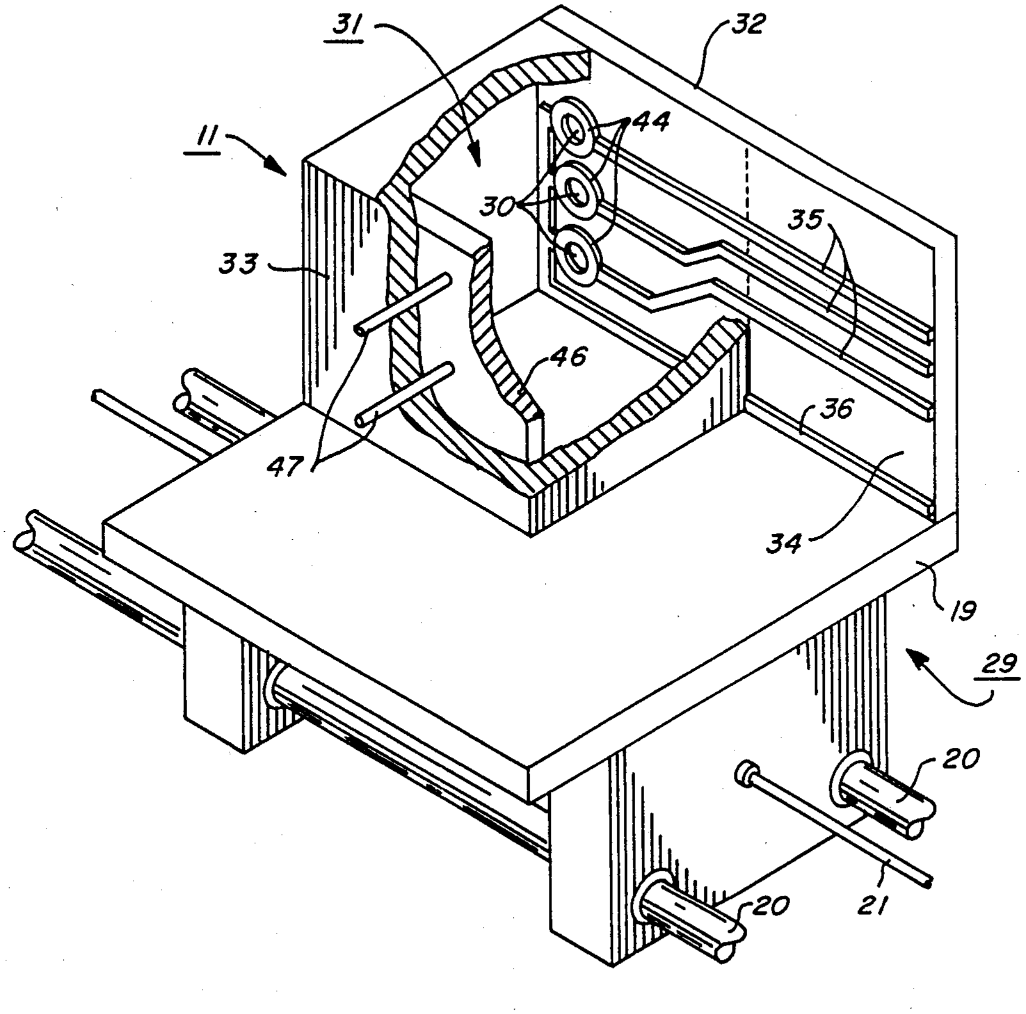
FIG. 2 is an enlarged, partially sectioned, schematical perspective view of the thermal ink jet printhead shown in FIG. 1.

FIG. 2 is an enlarged, partially sectioned, perspective schematic of the printhead 11 and carriage assembly 29 shown in FIG. 1. Liquid ink, not shown, is housed in the internal chamber 31 of the printhead at a slightly negative prssure in the range of 0.2 to 6 inches of water, with the preferred range being 1 to 2 inches. The printhead chamber holds a limited amount of ink, for example, 0.5 to 1.0 cc of ink to minimize the sloshing effect caused by the reciprocation of the carriage assembly and printhead. A plurality of passageways 30 in the printhead are linearly aligned perpendicular to the reciprocating direction of the printhead and parallel to the recording medium.

The printhead comprises two basic parts; a planar substrate 32 having the passageways 30 therethrough and a hollow, walled structure 33 having an open side. The planar substrate has heating elements 44 formed on the surface 34 substantially around each passageway entrance, where the entrance is defined as the intersection of the passageways and the planar substrate surface 34. Individual addressing electrodes 35 are patterned on the substrate surface 34 with a common return 36. The electrodes and common return terminate on end of the planar substrate to permit attachment of the conduits 24. The conduits may be, for example, a ribbon cable (not shown) and may be connected to the patterned electrode and common return by means well known in the art.

The passageways may have any cross-sectional area, but in the preferred embodiment, are circular with a diameter of about 12 $\mu$m (microns) and are approximately 24 $\mu$m (mcirons) microns long. The hollow, walled structure 33 with its open side contacting the planar substrate surface 34 and enclosing all of the passageway entrances and associated heating elements is sealingly bonded to planar substrate 32. An opening is formed in one wall of the structure 33 for connecting the flexible hose 27. The printhead is releasably mounted on the carriage support base 19 by any well known means or may be fixedly bonded thereto. Though only three passageways are shown in FIG. 2 for clarity of explanation of the inventive droplet generating mechanism, a larger number is generally used for printing; for example, 40 to 60 passages on about 4 mil centers.

Figure 3:
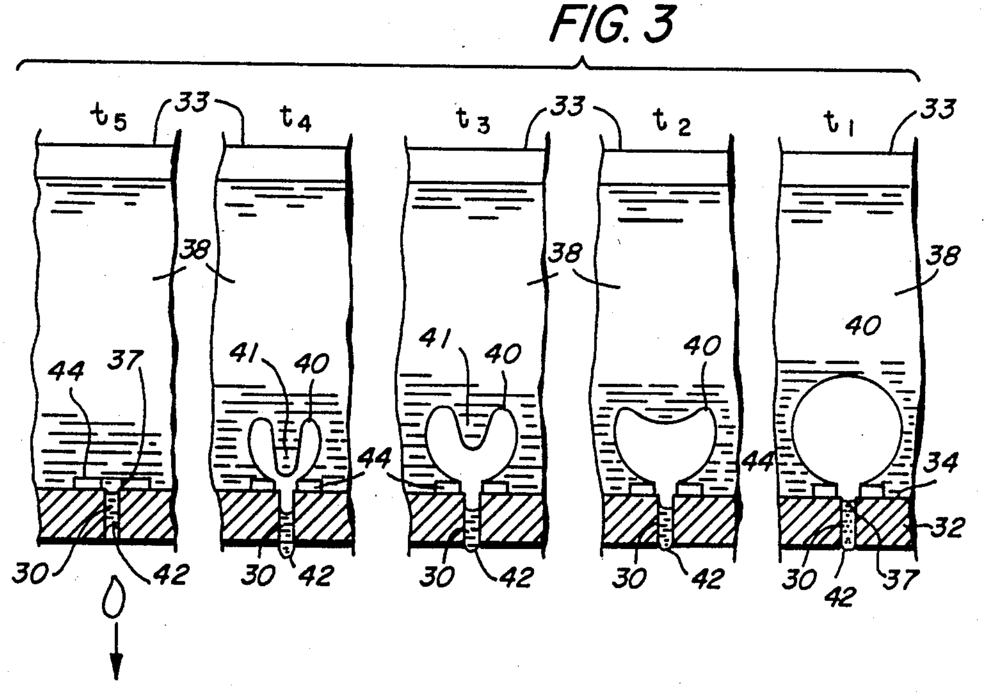
FIG. 3 is a schematical representation of the state of the vapor bubble at various instantaneous times depicting the impact induced droplet produced by the bubble collapse.
Figure 4:
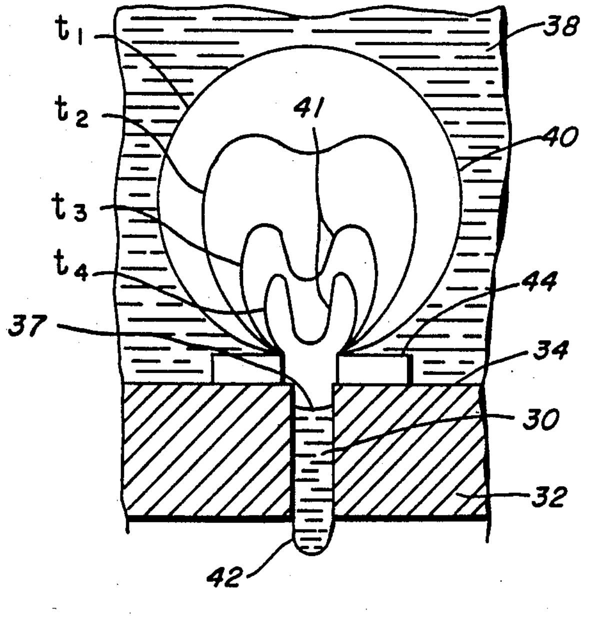
FIG. 4 is an enlarged surface shape and motion of the collapsing bubble at various instantaneous times.

Basically, the operating sequence of the thermal ink jet system starts with a current pulse of predetermined duration, about 20 kilohertz (KHz) in the preferred embodiment, through the heating element 44. FIGS. 3 and 4 depict a partial cross-sectional view of the printhead showing the ink 38 housed in the chamber 31 formed by the planar substrate 32 and walled structure 33. A cross-section of one passgeway 30 with an annular heating element 44 at its entrance clearly depicts the bubble collapse at instantaneous times and the effect that the bubble collapse has on the quantity or slug of ink in the passageway trapped between the bubble and the meniscus 42 at the passageway exit or nozzle. Heat is transferred to the ink from the heating element to superheat the ink above its normal boiling point, thus forming vapor bubble 40. Shortly after passage of the current pulse, the bubble 40 reaches its maximum growth at time t1. Only relatively low pressure is required for bubble formation because the bubble is formed in a pool of ink 38 contained in printhead chamber 31, as opposed to bubble formation in a capillary filled channel taught by the prior art. Note that the bubble formation depicted in FIGS. 3 and 4 do not cause significant motion in that slug of ink in the passageway 30 during this stage of bubble growth and the meniscus 42 is insignificantly affected until near total collapse of the bubble at time t4. The heating element may be one resistive path or multiple resistive paths currently addressed with current pulses of equal amplitude and duration, because the bubble must be symmetrical about the passageway entrance 37. Otherwise, the impact force vector would not be directed substantially through the center of the passageway. For maximum droplet formation and propulsion, the impact force vector should be directed along the passageway centerline or axis. At time t5, the droplet 12 is propelled toward the recording medium. The entire bubble formation and collapse sequence occurs in about 10–50 microseconds and the heating element can be readdressed with another current pulse after 100–500 microseconds minimum dwell time to enable the dynamic motion of the ink to become somewhat dampened.

In the prior art, the bubble collapses on the heating element and the collapse produces a severe cavitational force that erodes the heating element, reducing its operating lifetime. The present invention uses a heating element around the passageway entrance, so that the cavitational forces on the heating element is greatly reduced. The impact forces induced by the bubble collapse expels the droplet rather than hammering a heating element. The peripheral or annular heating elements, which may be segmented and individually addressed concurrently, is a thin-film resistive layer deposited on the surface 34 of the planar substrate 32 around the periphery of each passageway entrance 37. A thin-protective, insulative layer (not shown) is placed over the resistive layer to isolate it from the ink. As stated before, the pressure required to rapidly form a bubble in a pool of ink is much lower than that required to expel a droplet from a capillary channel as used in the prior art. Consequently, the heating elements of this invention do not require very high heating temperatures and the lower heating element temperatures increase the life of the device as well as reduce power requirements.

Once the energy pulse is over and the low pressure vapor bubble is formed, heat loss from the bubble to the surrounding liquid ink causes rapid condensation of the vapor and rapid pressure drop in the bubble. The subambient pressure in the bubble causes bubble collapse which is accompanied by a jet-like formation 41 on the bubble surface opposite the heating element 44. The surface shape and motion of a collapsing bubble is well known (refer to the article entitled "Vapor Cavity Collapse" by Plesset and Chapman, Journal of Fluid Mechanics, 1971), but the use of the impact force of the jetlike formation in the collapsing bubble to expel and propel a droplet is entirely novel.

An alternate embodiment of the present invention is provided by the addition of a high frequency pressure fluctuation of the ink pool in the printhead chamber 31.

A high frequency pressure, when applied and properly synchronized with the heating pulse, will significantly improve the performance of the printhead. In FIG. 1, an ultrasonic generator or piezoelectric transducer 46 is added to the wall of the hollow structure 33 opposite the passageways 30 in the planar substrate 33. Leads 47 sealingly penetrate the hollow structure 33 to activate the transducer 46. This piezoelectric transducer is used to produce pressure waves in the ink pool at a predetermined frequency in the range of 10–100 KHz. The amplitude of oscillation is adjusted so that the pressure fluctuations are just below the threshold of cavitation at the planar substrate 32. The passageway 30 cross sectional area, which is circular in the preferred embodiment, and the passageway length are chosen so that no net flow of ink 38 occurs due to the ultrasonic pressue fluctuations alone. The pressure in the vicinity of the passageway entrance can be expressed as a constant hydrostatic pressure together with a time varying sinusoidal component. Since the saturation temperature of the ink is above that of the total quantity or pool of ink in the printhead chamber 31, no vaporization will occur unless the temperature of the ink is raised. The effect of the sinusoidal ink pressure variation is to produce a sinusoidal variation of the ink saturation temperature, which can be used to advantage in the transfer of thermal energy to the ink from the heating element 44 and in the bubble 40 growth phase.

Figure 5:
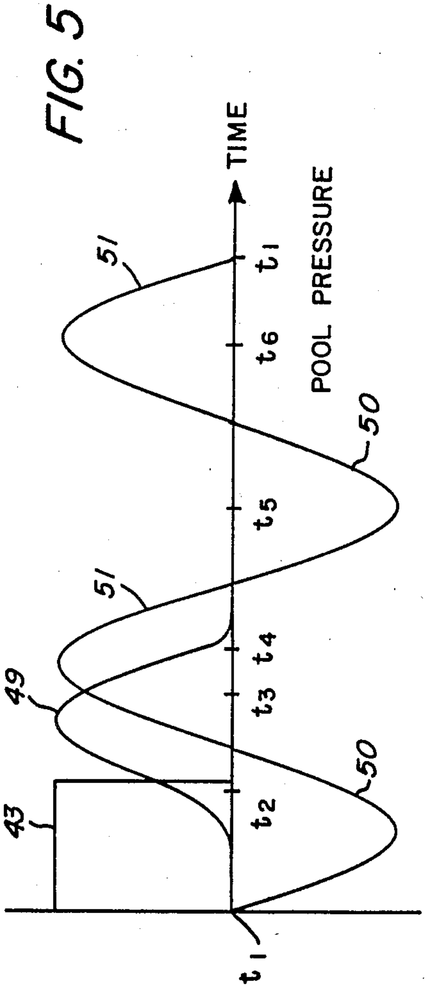
FIG. 5 is a plot of current pulse and pressure wave amplitude versus time showing the synchronization of lower sinusoidal portion of the pressure with the current pulse.
Figure 6:
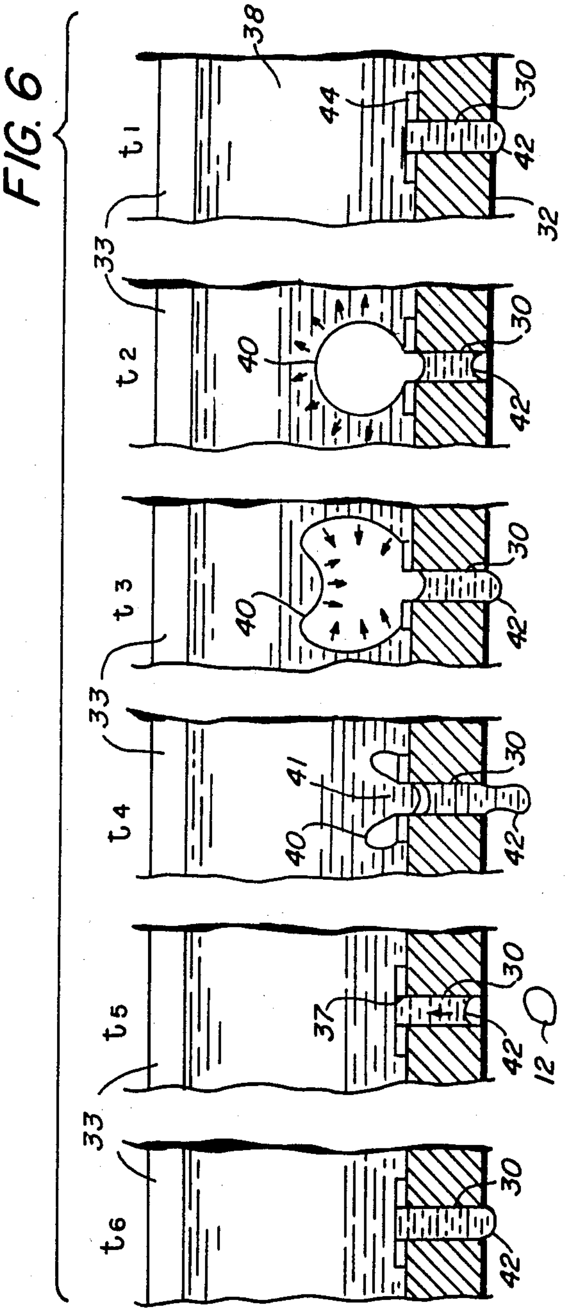
FIG. 6 is a schematic representation of the state of the vapor bubble at various instantaneous times with an ultrasonic generator providing sinusoidal pressure waves to the ink in the printhead.

When an ink droplet 12 is required for printing, a current pulse 43 is applied to the heating element 44 to raise the temperature of the ink in contact therewith, refer to FIGS. 5 and 6. At time t1, a current pulse 43 is applied to the heating element 44 and the current pulse application is synchronized with the lower pressure half cycle 50 of the sinusoidal pressure wave. This results in bubble growth shown in FIG. 5 as curve 49, with substantially lower current and temperature because of the lower ink pool pressures than that of the fixed pool pressure of the embodiment without an ultrasonic generator. Time t2 depicts the bubble growth just prior to termination of the current pulse with negligible receding of the meniscus 42. Time t3 shows that the maximum bubble size has already been reached and the bubble is collapsing while the sinusoidal pressure is still rising; note that the meniscus 42 is beginning to bulge. The pressure amplitude reaches a maximum at the time t4 and the bubble has currently nearly totally collapsed, producing a partially formed droplet that has not yet broken away from the protruding meniscus 42. At time t5, the droplet 12 has been propelled toward the recording medium, receding of the meniscus has reached a maximum withdrawal well away from the passageway entrance, so that air is not ingested, and the pressure wave amplitude has again reached its lowest value. The meniscus 42 has returned to its steady-state location at time t6 and is undergoing oscillation dampening while the higher pressure half cycle peaks in value. When the pressure wave amplitude drops from its high pressure at time t6 and reaches the end of a two-cycle fluctuation, the heating element may be energized again to produce another droplet. Thus, in this invention, the energy associated with high-speed, jet-like formations produced by the collapsing bubbles to expel a droplet is controlled and used to greater advantage than any previously known thermal ink jet printer.

In recapitulation, the present invention relates to the use of the impact induced by collapsing bubbles in a thermal ink jet printhead to produce moving droplets of liquid ink on demand. The printhead houses a pool of ink and has a linear array of passageways or nozzles in one wall thereof for the expulsion of droplets. Heating elements are uniformily formed around each passageway entrance and each heating element is selectively addressable with a current pulse to vaporize the contracting ink. Bubbles are symmetrically formed over the passageway entrance and collapse after passage of the current pulse. A jet-like formation is produced by the collapsing bubbles which through imapct on a slug of ink in the passageway between its entrance and exit propels a droplet therefrom towards a recording medmium. The passageways are sufficiently small in cross-sectional area and have a length long enough to prevent ink from leaking therefrom unless a bubble is formed and allowed to collapse.

In an alternate embodiment, an ultrasonic generator is used to produce pressure waves in the ink pool in the printhead. The amplitude of the pressure oscillation is adjusted so that the pressure fluctuations are just below the threshold of cavitation at the printhead wall containing the passageways. The pressure in the vicinity of the passageway entrances can be expressed as a constant hydrostatic pressure, together with a time varying sinusoidal component. The current pulse is synchronized with the lower pressure half cycle of pressure wave in order to obtain bubble growth with substantially lower energy pulses and temperatures.

Many modifications and variations are apparent from the foregoing description of the invention and all such modifications and variations are intended to be within the scope of the present invention.

We claim:

1. A printhead for use in a thermal ink jet printer comprising:

a housing having an internal chamber for containing liquid ink under a predetermined pressure, the chamber having a wall with at least one passageway therethrough, the passageway having an entrance in communication with the chamber and an exit that serves as a nozzle for directing droplets expelled therefrom toward a recording medium;

a heating element being formed on the chamber wall which substantially surrounds the passageway entrance;

means for supplying ink to the housing under the predetermined pressure in order to maintain the chamber filled with ink; and means for addressing the heating element with current pulses representative of digitized data signals to vaporize the ink contacting the heating element and to produce a bubble symmetrical about the passageway entrance, the collapse of which expels a droplet from the nozzle because of the impact forces induced thereby.

2. The printhead of claim 1, wherein the printhead further comprises:

an ultrasonic generator to produce uniformly fluctuating pressure waves in the ink in the housing having cyclically upper and lower amplitudes, the upper amplitude of the pressure waves being adjusted so that they are below the threshold of that amplitude that produces cavitation at the housing chamber wall containing said passageway; and means for activating the ultrasonic generator and adjusting the amplitude of the pressure waves produced thereby.

3. The printhead of claim 2, wherein the pressure at the passageway entrance is expressed as a constant hydrostatic pressure together with a time varying sinusoidal pressure component produced by the pressure waves; and wherein the lower half cycle of the sinusoidal pressure component is synchronized with the application of the current pulse to said heating element, so that lower current pulses and temperatures may be used to produce the bubble that expels said droplet.

4. The printhead of claim 1, wherein the at least one passageway is sufficiently small in cross-sectional area and has a length to cross-sectional area relationship to provide a flow resistance and fluid inertia to the ink therein which prevents the ink from weeping from the nozzle during bubble formation and growth.

5. The printhead of claim 4, wherein the passageway crosssectional area is circular with a diameter of about 12 μm and a length of about 24 μm.

6. The printhead of claim 1, wherein the heating element is segmented and each segment is concurrently addressed with current pulses of substantially equal magnitude and duration, so that the bubble produced by the current pulses is symmetrical about the passageway entrance and a force vector from the impact induced by the collapsing bubble is directed substantially through the center of the passageway and along its length.

7. The printhead of claim 1, wherein the bubbles produced by the current pulses isolate a quantity of ink in the passageway and the impact forces induced by the collapsing bubble strike and expel the isolated ink quantity from the passageway through the nozzle as a droplet, which is propelled into contact with a confronting recording medium.

* * * * *